US012703633B2

(12) United States Patent
Bridel et al.

(10) Patent No.: US 12,703,633 B2
(45) Date of Patent: Aug. 11, 2026

(54) COMPOSITE POWDER FOR USE IN THE NEGATIVE ELECTRODE OF A BATTERY AND A BATTERY COMPRISING SUCH A COMPOSITE POWDER

(71) Applicant: Umicore, Brussels (BE)

(72) Inventors: Jean-Sébastien Bridel, Olen (BE); Kun Feng, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 19/112,347

(22) PCT Filed: Sep. 18, 2023

(86) PCT No.: PCT/EP2023/075577
§ 371 (c)(1),
(2) Date: Mar. 17, 2025

(87) PCT Pub. No.: WO2024/061794
PCT Pub. Date: Mar. 28, 2024

(65) Prior Publication Data

US 2025/0256967 A1 Aug. 14, 2025

(30) Foreign Application Priority Data

Sep. 20, 2022 (EP) .................................... 22196479

(51) Int. Cl.
*C01B 32/05* (2017.01)

(52) U.S. Cl.
CPC .......... *C01B 32/05* (2017.08); *C01P 2002/08* (2013.01); *C01P 2002/82* (2013.01);
(Continued)

(58) Field of Classification Search
CPC .. C01B 32/05; C01P 2002/08; C01P 2002/82; C01P 2004/51; C01P 2004/61; C01P 2006/12; C01P 2006/40
See application file for complete search history.

(56) References Cited

U.S. PATENT DOCUMENTS

2012/0077087 A1* 3/2012 Cho ...................... H01M 4/133
252/502
2014/0170490 A1* 6/2014 Izuhara ................ H01M 4/386
429/211

(Continued)

FOREIGN PATENT DOCUMENTS

| CN | 101409345 A | 4/2009 |
|---|---|---|
| CN | 105280891 A | 1/2016 |

(Continued)

OTHER PUBLICATIONS

ISA/EPO: International Search Report and Written Opinion of International Application No. PCT/EP2023/075577, mailed Jan. 29, 2024.

(Continued)

*Primary Examiner* — Daniel S Gatewood
(74) *Attorney, Agent, or Firm* — Rimon P.C.; Allyn B. Elliott

(57) ABSTRACT

A composite powder for use in a negative electrode of a battery comprising composite particles, said composite particles comprising a carbon matrix material and silicon-based particles embedded in said carbon matrix material, said composite powder having a Raman spectrum, wherein a D band and a D'band, both corresponding to the carbon matrix material contribution, have their respective maximum intensity $I_D$ between 1330 $cm^{-1}$ and 1360 $cm^{-1}$ and $I_D$' between 1600 $cm^{-1}$ and 1620 $cm^{-1}$, wherein the ratio $I_D/I_D$' is at least equal to 0.9 and at most equal to 4.0.

17 Claims, 2 Drawing Sheets

(52) U.S. Cl.
CPC ...... *C01P 2004/51* (2013.01); *C01P 2004/61* (2013.01); *C01P 2006/12* (2013.01); *C01P 2006/40* (2013.01)

(56) References Cited

U.S. PATENT DOCUMENTS

| | | | | |
|---|---|---|---|---|
| 2015/0349335 | A1* | 12/2015 | Won | H01M 4/587 429/231.8 |
| 2016/0181602 | A1* | 6/2016 | Mutoh | H01M 4/48 252/182.1 |
| 2016/0233520 | A1 | 8/2016 | Takahashi et al. | |
| 2016/0336585 | A1* | 11/2016 | Furuya | H01M 4/625 |
| 2016/0365567 | A1 | 12/2016 | Troegel et al. | |
| 2019/0198863 | A1* | 6/2019 | Lee | H01M 4/13 |

FOREIGN PATENT DOCUMENTS

| | | | |
|---|---|---|---|
| EP | 3113261 | A1 | 1/2017 |
| GB | 2563455 | A | 12/2018 |
| JP | 2015144101 | A | 8/2015 |
| JP | 2015228370 | A | 12/2015 |
| JP | 2017506413 | A | 3/2017 |
| JP | 2020523269 | A | 8/2020 |
| KR | 20160104720 | A | 9/2016 |
| KR | 20200100252 | A | 8/2020 |
| WO | 2010065739 | A1 | 6/2010 |
| WO | 2015019993 | A1 | 2/2015 |
| WO | 2015045852 | A1 | 4/2015 |
| WO | 2018229515 | A1 | 12/2018 |
| WO | 2022074031 | A1 | 4/2022 |

OTHER PUBLICATIONS

Korean Patent Office: Office Action in Korean Patent Application No. 10-2025-7012855, mailed May 13, 2025, with English Translation, 11 pages.

China National Intellectual Property Administration: Office Action in Chinese Patent Application No. 202380063644.2 , mailed May 27, 2025, with English Translation, 17 pages.

JPO: English Translation of Notice of Reasons for Rejection issued in corresponding Japanese Patent Application No. 2025-517446, mailed Sep. 9, 2025, 5 pages.

* cited by examiner

COMPOSITE POWDER FOR USE IN THE NEGATIVE ELECTRODE OF A BATTERY AND A BATTERY COMPRISING SUCH A COMPOSITE POWDER

CROSS REFERENCE TO RELATED APPLICATIONS

This application is a U.S. National Stage Application of International Patent Application No. PCT/EP2023/075577, filed on Sep. 18, 2023, which claims priority to European Patent Application No. 22196479.4, filed on Sep. 20, 2022.

TECHNICAL FIELD AND BACKGROUND

The present invention relates to a composite powder suitable for use in the negative electrode of a battery and a battery comprising such a composite powder.

Lithium ion (Li-ion) batteries are currently the best performing batteries and already became the standard for portable electronic devices. In addition, these batteries now rapidly gain ground in other industries such as automotive and electrical storage. Enabling advantages of such batteries are a high-energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular a battery's energy density is the active material in the anode. Therefore, to improve the energy density, the use of electrochemically active materials comprising silicon, in the negative electrode, has been investigated over the past years.

In the art, the performance of a battery containing Si-based electrochemically active powders is generally quantified by a so-called cycle life of a full-cell, which is defined as the number of times or cycles that a cell comprising such material can be charged and discharged until it reaches 70% of its initial discharge capacity. Most works on silicon-based electrochemically active powders are therefore focused on improving said cycle life.

A drawback of using a silicon-based electrochemically active material in an anode is its large volume expansion during charging, which is as high as 300% when the lithium ions are fully incorporated, e.g. by alloying or insertion, in the anode's active material—a process often called lithiation. The large volume expansion of the silicon-based materials during lithium incorporation may induce stresses in the silicon-based particles, which in turn could lead to a mechanical degradation of the silicon material. Repeated periodically during charging and discharging of the Li-ion battery, the repetitive mechanical degradation of the silicon-based electrochemically active material may reduce the life of a battery to an unacceptable level.

Further, a negative effect associated with silicon is that a thick SEI, a Solid-Electrolyte Interface, may be formed on the anode. A SEI is a complex reaction product of the electrolyte and lithium, which leads to a loss of lithium availability for electrochemical reactions and therefore to a poor cycle performance, which is the capacity loss per charging-discharging cycle. A thick SEI may further increase the electrical resistance of a battery and thereby limit its ability to charge and discharge at high currents.

In principle, the SEI formation is a self-terminating process that stops as soon as a 'passivation layer' has formed on the surface of the silicon-based material. However, because of the volume expansion of silicon-based particles, both silicon-based particles and the SEI may be damaged during discharging (lithiation) and recharging (delithiation), thereby freeing new silicon surface and leading to a new onset of SEI formation.

To solve the above-mentioned drawbacks, composite powders are usually used. In these composite powders, nano-sized silicon-based particles are mixed with at least one component suitable to protect the silicon-based particles from electrolyte decomposition and to accommodate volume changes. Such a component may be a carbon-based material, preferably forming a matrix.

The composite powders usually additionally contain graphitic particles, to adjust their specific capacity to a practical level, between 500 mAh/g and 1500 mAh/g.

Such composite powders are mentioned, for example, in US 2019/0198863, disclosing an anode active material comprising a composite of a Si-based or Sn-based material and a carbon-based material, wherein the Raman spectrum peak intensity ratio ($I_D/I_D'$) of a peak intensity ($I_D$) of a D peak (1360 $cm^{-1}$ to 1370 $cm^{-1}$) relative to a peak intensity ($I_D'$) of a D' peak (1620 $cm^{-1}$ to 1625 $cm^{-1}$) of the carbon-based material is 4.5 to 10.

GB 2563455 discloses a particulate material consisting of a plurality of composite particles, wherein the composite particles comprise a plurality of silicon nanoparticles dispersed within a conductive carbon matrix, wherein the contribution of the conductive carbon matrix in the Raman spectrum of the particulate material is characterized by a large G-band and a significant D-band. GB 2563455 is silent about both the presence of a D'-band and about a technical effect linked to the ratio of the intensities $I_D/I_D'$ of the D-band and the D'-band respectively. WO 2022074031 discloses a powder of carbonaceous matrix material particles with silicon-based sub-particles dispersed therein. WO 2022074031 does not disclose any Raman data.

EP 3113261 discloses a negative electrode material for a non-aqueous electrolyte secondary battery, comprising a conductive powder composed of silicon-based active material particles coated with a conductive carbon film, wherein the conductive carbon film exhibits a peak intensity ratio $I_D/I_G$ of 1.1 or less where $I_D$ is a peak intensity of the D-band and $I_G$ is a peak intensity of a G-band, the D-band and the G-band being determined from the Raman spectrum of the conductive carbon film. EP 3113261 is silent about both the presence of a D'-band and about a technical effect linked to the ratio of the intensities $I_D/I_D'$ of the D-band and the D'-band respectively.

WO 2010/065739 discloses an article of manufacture comprising carbon-containing matrix having a Raman spectrum with up to 4 bands, namely at about 1360 $cm^{-1}$ (D band), at about 1580 $cm^{-1}$ (G band), at about 1620 $cm^{-1}$ (D' band) and at about 2660 $cm^{-1}$ (DP band). WO 2010/065739 is silent about a technical effect linked to the ratio of the intensities $I_D/I_D'$ of the D-band and the D'-band respectively and about silicon-based particles embedded in the carbon-containing matrix.

Despite the use of such composite powders, there is still room for improvement of the performance of batteries containing Si-based electrochemically active powders. In particular, the existing composite powders do not allow achieving both a high capacity and a long cycle life, which is essential, in particular for the batteries of the electric vehicles.

It is an objective of the present invention to provide a composite powder comprising composite particles, said composite particles comprising a carbon matrix material with silicon-based particles embedded therein, said composite powder which once used in the negative electrode of a battery, is advantageous in that it allows achieving a high capacity combined to a long cycle life.

SUMMARY OF THE INVENTION

This objective is achieved by providing a composite powder according to the invention, said composite powder, which once used in the negative electrode of a battery, allows to achieve a high capacity combined to a long cycle life, as demonstrated in Examples 1 to 3 compared to Counterexamples 1 to 3.

DETAILED DESCRIPTION

In the following detailed description, preferred embodiments are described in detail to enable practice of the invention. Although the invention is described with reference to these specific preferred embodiments, it will be understood that the invention is not limited to these preferred embodiments. To the contrary, the invention includes numerous alternatives, modifications and equivalents as will become apparent from considering the following detailed description and accompanying drawings.

In a first aspect, the present invention concerns a composite powder for use in a negative electrode of a battery comprising composite particles, said composite particles comprising a carbon matrix material and silicon-based particles embedded in said carbon matrix material, said composite powder having a Raman spectrum obtained by Raman scattering, wherein a D band and a D' band, both corresponding to the carbon matrix material contribution, have their respective maximum intensity $I_D$ between 1330 $cm^{-1}$ and 1360 $cm^{-1}$ and $I_D'$ between 1600 $cm^{-1}$ and 1620 $cm^{-1}$, wherein the ratio $I_D/I_D'$ is at least equal to 0.9 and at most equal to 4.0.

The maximum intensity $I_D$ is preferably between 1330 $cm^{-1}$ and 1359 $cm^{-1}$, more preferably between 1330 $cm^{-1}$ and 1357 $cm^{-1}$, even more preferably between 1330 $cm^{-1}$ and 1355 $cm^{-1}$, and the maximum intensity $I_D'$ is preferably between 1600 $cm^{-1}$ and 1619 $cm^{-1}$, more preferably between 1600 $cm^{-1}$ and 1617 $cm^{-1}$, even more preferably between 1600 $cm^{-1}$ and 1615 $cm^{-1}$.

Preferably, the composite particles consist of a carbon matrix material with silicon-based particles embedded therein.

By "composite particles comprising a carbon matrix material and silicon-based particles embedded in said carbon matrix material", it is meant that the composite particles are, on average, larger in size than the silicon-based particles, since they comprise these latter. The composite particles are typically of micrometric size, while the silicon-based particles are typically of nanometric size.

By "silicon-based particles embedded in said carbon matrix material", it is meant that at least 50% of the surface of the silicon-based particles is covered with the carbon matrix material, preferably that at least 75% of the surface of the silicon-based particles is covered with the carbon matrix material and preferably that the silicon-based particles are completely covered with the carbon matrix material, to ensure a proper protection against the reaction with the electrolyte during cycling. In other words, the silicon-based particles and the carbon matrix material are not just mixed together, since a proper coverage of the surface of the silicon-based particles cannot be obtained that way.

The silicon-based particles embedded in the carbon matrix material either form agglomerates of a size smaller than 1 μm or do not for agglomerates at all. Hence, in the composite powder according to the invention, the silicon-based particles are preferably in contact only with each other and/or with the carbon matrix material.

The silicon-based particles may have any shape, e.g. substantially spherical but also irregularly shaped, rod-shaped, plate-shaped, etc. In the silicon-based particles, the silicon is present in its majority as silicon metal, to which minor amounts of other elements may have been added to improve properties, or which may contain some impurities, such as oxygen or traces of metals. When considering all elements except oxygen, the average silicon content in such a silicon-based particle is preferably 80 weight % or more, and more preferably 90 weight % or more with respect to the total weight of the silicon-based particle.

In the Raman spectra of graphitic materials, such as the carbon matrix material of the composite powder according to the present invention, the most prominent features are the so-called G band, usually appearing at about 1580 $cm^{-1}$, the D band at about 1350 $cm^{-1}$, the D' band at about 1610 $cm^{-1}$ and the G' band (also called 2D band) at about 2700 $cm^{-1}$. An illustration of a typical Raman spectrum of a graphitic material with the 4 different bands is presented at FIG. 1.

The presence of a G band is characteristic of in-plane vibrational modes involving sp2-hybridized carbon. The D and D' band are defect-induced Raman features, which cannot be seen for highly crystalline carbon materials with little defects. The intensity ratio $I_D/I_G$ for the D band and the G band is often used for characterizing the defect quantity in graphitic materials.

However, in the framework of the present invention, the inventors have noticed a surprising direct correlation between another intensity ratio, namely $I_D/I_D'$ for the D band and D' band, and the performance in battery, as it is presented elsewhere in this document.

It is believed by the inventors that the $I_D/I_D'$ is a good indicator of both the concentration of defects and their type, such as edges, vacancy-like defects, boundary-like defects or defects associated to a change of carbon-hybridization, for example from $sp^2$ into $sp^3$.

A ratio $I_D/I_D'$ higher than 4.0 is not desired because it is an indication that the concentration of defects in the carbon matrix material is too high, which may for example be detrimental to the electronic conductivity of the composite particles. Furthermore, this may also be an indication that the defects are of a "more damaging" type, such as those associated with $sp^3$ hybridization, which are believed to be detrimental to the cycle life of a battery.

A ratio $I_D/I_D'$ lower than 0.9 is not desired either because it is an indication that the concentration of defects in the carbon matrix is too low, which may for example be detrimental to the ionic conductivity of the composite particles.

In other words, the technical effect associated with the ratio $I_D/I_D'$ is at its maximum between 0.9 and 4.0.

In another embodiment according to the first aspect of the invention, the ratio $I_D/I_D'$ is preferably at least equal to 1.0, more preferably at least equal to 1.2, even more preferably at least equal to 1.4, particularly preferably at least equal to 1.6, more particularly preferably at least equal to 1.8 and utterly preferably at least equal to 2.0. The ratio $I_D/I_D'$ is preferably at most equal to 3.8, more preferably at most equal to 3.6, particularly preferably at most equal to 3.4, more particularly preferably at most equal to 3.2 and utterly preferably at most equal to 3.0. In other words, the technical effect associated with the ratio $I_D/I_D'$ is at its maximum between 2.0 and 3.0.

In another embodiment according to the first aspect of the invention, the carbon matrix material is soft carbon. Soft carbon corresponds to an arrangement of small disordered graphitic domains that can be converted to graphite upon heating at a temperature of 3000° C., in opposition to hard carbon which is not graphitizable. Soft carbon shows a higher electronic conductivity compared to hard carbon and is therefore preferable. Furthermore, thanks to its disordered collection of small graphitic domains, which leads to the presence of nanovoids in the matrix material, the volumetric expansion of a particle comprising a matrix material mostly comprising soft carbon, during the lithiation of the anode, is reduced compared to a particle comprising a matrix material mostly comprising graphite or graphene. A reduced volumetric expansion will lead to a longer cycle life in a battery.

In another embodiment according to the first aspect of the invention, the composite powder has a silicon content S expressed in weight percent (wt %), wherein 10 wt %≤S≤60 wt % and preferably wherein 20 wt %≤S≤50 wt %.

A composite powder having a silicon content inferior to 10 wt %, preferably inferior to 20 wt %, would have a too limited specific capacity and would therefore not allow to reach a high energy density for the battery. A composite powder having a silicon content superior to 60 wt %, preferably superior to 50 wt %, would suffer too much from the volume expansion associated with this high silicon content and would therefore result in a battery having a reduced cycle life.

In yet another embodiment according to the first aspect of the invention, the composite powder has a carbon content C expressed in weight percent (wt %), wherein 30 wt %≤C≤90 wt %.

When the carbon content in the composite powder is lower than 30 wt %, the carbonaceous matrix material is not present in an amount sufficient to fully cover the silicon-based particles, therefore leading to an increased electrolyte decomposition at the surface of the silicon-based particles and thus to an increased SEI formation. When the carbon content in the composite powder is higher than 90 wt %, the specific capacity of the composite powder is too low.

In another embodiment according to the first aspect of the invention, the composite powder has a silicon content S and an oxygen content N, both expressed in weight percent (wt %), wherein N≤0.20×S and preferably wherein N≤0.15×S. A composite powder having a too high oxygen content would suffer from an additional irreversible consumption of lithium by the formation of lithium silicate ($Li_2SiO_3$, $Li_4SiO_4$) during the first lithiation of the powder, thus increasing the initial irreversible capacity loss of a battery containing such a composite powder.

In another embodiment according to the first aspect of the invention, the silicon-based particles are characterized by a number-based size distribution having a d50, the d50 being larger than or equal to 20 nm and smaller than or equal to 150 nm. The number-based size distribution is based on a visual analysis, with or without assistance of an image analysis program, of a minimum number of silicon-based particles comprised in the composite powder. This minimum number of silicon-based particles is at least 1000 particles. An example of a determination of a number-based distribution of Si-based particles is provided in the "Analytical methods" section.

For the sake of clarity, a d50 of 100 nm for example, would here mean that 50% in number of the at least 1000 silicon-based particles have a size smaller than 100 nm and that 50% in number of the at least 1000 silicon-based particles have a size larger than 100 nm.

Silicon-based particles having a number-based size distribution with a d50 lower than 20 nm are very difficult to disperse efficiently in the carbon matrix material, which may decrease the electronic conductivity of the powder.

Silicon-based particles having a number-based size distribution with a d50 larger than 150 nm are more subject to fractures during their lithiation, causing a dramatic reduction of the cycle life of a battery containing such a composite powder.

It is considered that the d50 is not affected by the process for making the composite powder, which means that the d50 value of the silicon-based powder used as precursor in the process is the same as the d50 value of the silicon-based particles comprised in the composite powder.

In yet another embodiment according to the first aspect of the invention, the silicon-based particles are covered, for at least 50% of their surface, preferably for at least 75% of their surface, with the carbon matrix material. Preferably, the silicon-based particles are completely covered with the carbon matrix material. This can be visually confirmed based on the analysis of one or several SEM images of cross-sections of composite particles, comprising the silicon-based particles. As already mentioned, a negative effect associated with silicon is that a thick SEI, a Solid-Electrolyte Interface, may be formed on the anode, in particular on the silicon-based particles. Since the silicon-based particles are affected by a large volume variation during the lithiation/delithiation process in the battery, the SEI which has already formed might break again, leading to a continuous consumption of lithium and thereby to a dramatic drop of the cycle life of the battery. Protecting the surface of the silicon-based particles with the carbon matrix material, at least partially, is an efficient solution against the continuous formation of the SEI and the loss in cycle life.

In another embodiment according to the first aspect of the invention, the silicon content in the silicon-based particles is at least equal to 80 wt % and preferably at least equal to 90 wt %.

Preferably, the silicon-based particles are free of other elements than Si and O, to avoid a too low specific capacity of the silicon-based particles. The silicon-based particles being the main contributor to the specific capacity of the composite powder, it is preferable that their own capacity is as high as possible and therefore that their content of silicon is as high as possible, in this case at least 80 wt % and preferably at least 90 wt %.

In another embodiment according to the first aspect of the invention, the composite powder also comprises graphite and/or graphene particles, such that neither the graphite particles, nor the graphene particles are embedded in the carbon matrix material. By "neither the graphite particles, nor the graphene particles are embedded in the carbon matrix material" it is meant that less than 10% of the surface of the graphite and/or graphene particles is covered with the carbon matrix material, preferably that less than 5% of the surface is covered with the carbon matrix material and more preferably that their surface is not covered at all with the carbon matrix material. This can be visually confirmed based on the analysis of one or several SEM images of cross-sections of composite powder. The fact that the graphite and/or graphene particles are not embedded in the matrix material is beneficial since only the silicon-based particles need to be covered with the carbon matrix material, hence less carbon matrix material having a high irreversible capacity and a low specific capacity is needed.

There may however be some contacts between the composite particles and the particles of graphite and/or graphene, located at their outer surface. This is even preferable in order to ensure a good electronic conductivity of the composite powder and thus a high rate capability of a battery comprising the composite powder.

Furthermore, the graphite particles act as a spacer between the composite particles, thus preventing an agglomeration of these latter into an agglomerated powder. In the absence of such a spacer, the agglomerated powder, in order to be used in the negative electrode of a battery, may require a mechanical treatment, such as a grinding step, which might result in a weakening of the matrix material integrity and eventually in a lower performance of a battery comprising such an agglomerated powder.

Alternatively, the composite powder may also comprise exfoliated graphite, expanded graphite and/or graphene nanoplatelets, all also not being embedded in the matrix material, for the same reasons as provided above.

Since those graphitic materials might have an influence on the Raman spectrum of the composite powder, their contribution should be removed to obtain the ratio $I_D/I_{D}'$ only for the contribution of the carbon matrix material, in particular their contribution to the D and D' bands. The procedure is explained in more details in the "Analytical methods" section.

In yet another embodiment according to the first aspect of the invention, the composite powder has a BET surface area which is at most 10 $m^2/g$ and preferably at most 8 $m^2/g$.

It is preferable for the composite powder to have a low BET specific surface area, to decrease the surface of electrochemically active particles in contact with the electrolyte, in order to limit the SEI formation, which consumes lithium, and thus to limit the loss in cycle life of a battery containing such a composite powder.

In another embodiment according to the first aspect of the invention, the composite particles have a volume-based particle size distribution having a D10, a D50 and a D90, with 1 μm≤D10≤10 μm, 5 μm≤D50≤25 μm and 10 μm≤D90≤40 μm. For the sake of clarity, a D50 of 15 μm for example, would here mean that 50% in volume of the composite particles have a size smaller than 15 μm and that 50% in volume of the composite particles have a size larger than 15 μm.

Particles of matrix material having a volume-based size distribution with a D50 smaller than 5 μm, may have a too high specific surface and thus increase the surface of reaction with the electrolyte and the formation of SEI, which is disadvantageous for the reasons previously explained. Particles of matrix material having a volume-based size distribution with a D50 larger than 25 μm, may, due to their size, be more susceptible to suffer from the formation of fractures during the lithium uptake, thus leading to a reduced cycle life of the battery containing such particles.

In a second aspect, the present invention concerns a negative electrode for a battery, preferably a lithium-ion battery, comprising a composite powder according to the invention. The negative electrode typically also comprises electronically conductive additives, such as carbon black, graphite particles, graphene particles, carbon nanotubes, or a mixture thereof. The content of electronically conductive additives is comprised between 0% and 10% by weight, in particular from 0.1% to 5% by weight, relative to the total weight of the negative electrode layer (excluding the current collector).

The negative electrode typically also comprises a binder or a mixture of binders. Specific examples of binders include polysaccharides, lithium-polyacrylate (Li-PAA), sodium polyacrylate (Na-PAA), potassium polyacrylate (K-PAA), polyacrylic acid (H-PAA), sodium carboxymethyl cellulose (Na-CMC), styrene-butadiene rubber (SBR). The binder(s) is/are added to improve the cohesion of the various components of the negative electrode, its mechanical strength on the current collector or even its flexibility properties. The binder(s) represent from 1% to 15% by weight, in particular from 2% to 10% by weight, relative to the total weight of the negative electrode layer (excluding the current collector). An example of a negative electrode preparation is provided elsewhere in this document.

Finally, the present invention also concerns a battery, preferably a lithium-ion battery, comprising a negative electrode according to the invention, and therefore comprising a composite powder according to the invention, as previously defined or prepared as previously disclosed.

A battery according to the invention more specifically comprises a negative electrode (anode) according to the invention, a positive electrode (cathode) and an electrolyte, preferably a non-aqueous electrolyte. As examples of the positive electrode, mention may be made of the positive electrode active materials selected from $LiCoO_2$, $LiNi_{0,6}Mn_{0,2}Co_{0,2}O_2$, $LiNi_{0,8}Mn_{0,1}Co_{0,1}O_2$, $LiNi_{0,8}Co_{0,15}Al_{0,05}O_2$, $Li_{1,2}Ni_{0,2}Mn_{0,6}O_2$, $LiFePO_4$, and the like. The electrolyte may be preferably a non-aqueous electrolytic solution, a non-aqueous polymer electrolyte or even a solid electrolyte. Specific examples thereof include an organic electrolytic solution obtained by dissolving lithium salt such as $LiClO_4$, $LiPF_6$, $LiAsF_6$, $LiBF_4$, $LiSO_3CF_3$, $CH_3SO_3Li$, $CF_3SO_3Li$ or the like into a non-aqueous solvent such as ethylene carbonate (EC), diethyl carbonate (DEC), dimethyl carbonate (DMC), fluoro ethylene carbonate (FEC), ethyl methyl carbonate (EMC), propylene carbonate (PC), butylene carbonate, acetonitrile, propionitrile, dimethoxyethane, tetrahydrofuran, γ-butyrolactone or the like; a gel polymer electrolyte comprising polyethylene oxide, polyacrylonitrile, polyvinylidene fluoride, polymethyl methacrylate or the like; and a solid polymer electrolyte comprising a polymer having an ethylene oxide bond. Moreover, an additive which causes a decomposition reaction during initial charge of the lithium ion battery may be added to the electrolytic solution. Specific examples of additives include vinylene carbonate (VC), biphenyl, propane sultone (PS), fluoro ethylene carbonate (FEC), ethylene sultone(ES) or the like. The additive amount thereof is preferably not less than 0.1% by weight and not more than 20% by weight, relative to the total weight of the electrolyte.

ANALYTICAL METHODS USED

Determination of the Silicon Content

Figure 1:
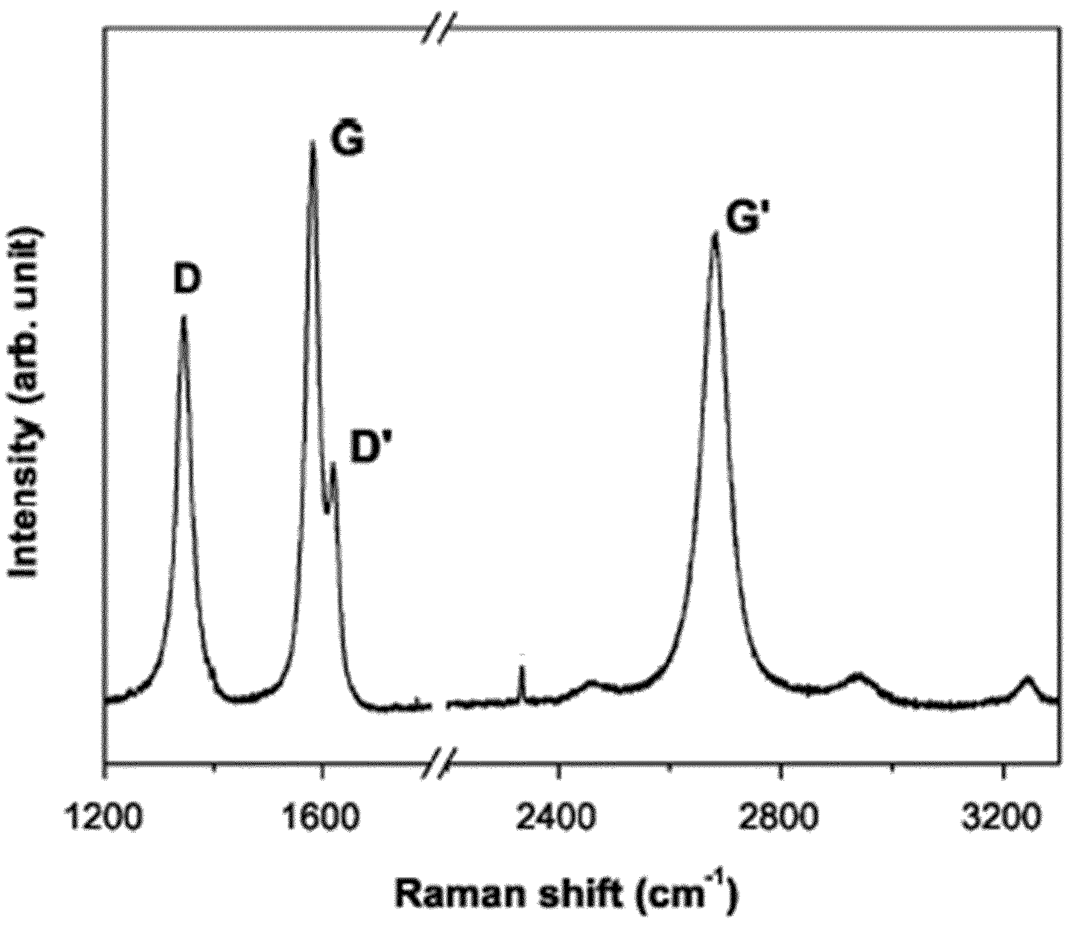
FIG. 1: Illustration of a Raman spectrum of a graphitic material

The silicon content of the composite powders is measured by X-Ray Fluorescence (XRF) using an energy dispersive spectrometer. This method has an experimental random error of +/−0.3 wt % Si.

Determination of the Oxygen Content

The oxygen content of the composite powders is determined by the following method, using a LECO TC600 oxygen-nitrogen analyzer. A sample of the powder to be analyzed is put in a closed tin capsule that is put itself in a nickel basket. The basket is put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.

Determination of the Carbon Content

The carbon content of the composite powders is determined by the following method, using a Leco CS230 carbon-sulfur analyzer. The sample is melted in a constant oxygen flow in a ceramic crucible in a high frequency furnace. The carbon in the sample reacts with the oxygen gas and leaves the crucible as CO or $CO_2$. After conversion of an eventual presence of CO into $CO_2$, all produced $CO_2$ is finally detected by an infrared detector. The signal is finally converted into a carbon content.

Determination of the Specific Surface Area (BET)

The specific surface area of the composite powders is measured with the Brunauer-Emmett-Teller (BET) method using a Micromeritics Tristar 3000. 2 g of the powder to be analyzed is first dried in an oven at 120° C. for 2 hours, followed by $N_2$ purging. Then the powder is degassed in vacuum at 120° C. for 1 hour prior to the measurement, in order to remove adsorbed species.

Determination of the Electrochemical Performance

The electrochemical performance of the composite powders in the examples and the counterexamples is determined by the following method.

The powders to be evaluated are sieved using a 45 μm sieve and mixed with carbon black, carbon fibers and sodium carboxymethyl cellulose binder in water (2.5 wt %). The ratio used is 89 weight parts composite powder/1 weight part carbon black (C65)/2 weight parts carbon fibers (VGCF) and 8 weight parts carboxymethyl cellulose (CMC). These components are mixed in a Pulverisette 7 planetary ball mill for 30 minutes at 250 rpm.

A copper foil cleaned with ethanol is used as current collector. A 200 μm thick layer of the mixed components is coated on the copper foil. The coated copper foil is then dried for 45 minutes in vacuum at 70° C. A 1.27 $cm^2$ circle is punched from the dried coated copper foil and used as an electrode in a coin cell using lithium metal as counter electrode. The electrolyte is 1M $LiPF_6$ dissolved in EC/December 1/1+2% VC+10% FEC solvents.

All coin-cells are cycled using a high precision battery tester (Maccor 4000 series) using the procedure described below, where “CC” stands for “constant current” and “CV” stands for “constant voltage”.

Cycle 1:
- Rest 6 h
- CC lithiation to 10 mV at C/10, then CV lithiation until C/100
- Rest 5 min
- CC delithiation to 1.5 V at C/10
- Rest 5 min From cycle 2 on:
- CC lithiation to 10 mV at C/2, then CV lithiation until C/50
- Rest 5 min
- CC delithiation to 1.2 V at C/2
- Rest 5 min The coulombic efficiency (CE) of the coin-cell, being the ratio of the capacity at delithiation to the capacity at lithiation at a given cycle, is calculated for the initial cycle as well as for the subsequent ones. The initial cycle is the most important one in terms of coulombic efficiency, since the reaction of SEI formation has a huge impact on the CE. Typically for a silicon-based powder the coulombic efficiency at the initial cycle can be as low as 80% (or even lower), corresponding to an irreversible capacity loss for the coin-cell of 20%, which is huge. The target is to reach at least 90% CE at the initial cycle.

For the subsequent cycles even though the CE usually increases well over 99%, the skilled person will be aware that even a small difference in coulombic efficiency per cycle, will have, over the hundreds or thousands of charging-discharging cycles a battery is expected to last, a significant cumulative effect. To give an example, a cell with an initial capacity of 1 Ah having an average CE of 99.8% will, after 100 charging-discharging cycles, have a remaining capacity of 0.8 Ah, which is 60% higher than for a cell having an average CE of 99.5% (remaining capacity of 0.5 Ah).

The target in terms of average CE from cycle 5 to cycle 50 is to reach at least 99.5%, preferably at least 99.55% for a cell comprising a composite powder with a specific capacity of 800±20 mAh/g.

Determination of the Number-Based Particle Size Distribution

The number-based particle size distribution of the silicon-based particles is determined via an electron microscopy analysis (SEM or TEM) of a cross-section of the composite powder, combined with an image analysis.

To do this, a cross-section of the composite powder, comprising multiple cross-sections of composite particles, each of them comprising multiple cross-sections of silicon-based particles, is prepared following the procedure detailed hereunder.

500 mg of the composite powder to be analyzed is embedded in 7 g of a resin (Buehler EpoxiCure 2) consisting of a mix of 4 parts Epoxy Resin (20-3430-128) and 1 part Epoxy Hardener (20-3432-032). The resulting sample of 1" diameter is dried during at least 8 hours. It is then polished, first mechanically using a Struers Tegramin-30 until a thickness of maximum 5 mm is reached, and then further polished by ion-beam polishing (Cross Section Polisher Jeol SM-09010) for about 6 hours at 6 kV, to obtain a polished surface. A carbon coating is finally applied on this polished surface by carbon sputtering using a Cressington 208 carbon coater for 12 seconds, to obtain the sample, also called “cross-section”, that will be analyzed by SEM.

The prepared cross-section is then analyzed using a FEG-SEM JSM-7600F from JEOL equipped with an EDS detector Xflash 5030-127 from Bruker (30 $mm^2$, 127 eV). The signals from this detector are treated by the Quantax 800 EDS system from Bruker.

The enlargements are generated by applying a voltage of 15 kV at a working distance of several millimeters. The images from the backscattered electrons are reported when adding value to the images from the optical microscope.

The size of a silicon-based particle is considered to be equivalent to the maximum straight-line distance between two points on the perimeter of a discrete cross-section of that silicon-based particle.

For the purpose of illustrating, in a non-limitative way, the determination of the number-based particle size distribution of silicon-based particles, a SEM-based procedure is provided below.

1. Multiple SEM images of the cross-section of the composite powder comprising composite particles with silicon-based particles dispersed therein, are acquired.
2. The contrast and brightness settings of the images are adjusted for an easy visualization of the cross-sections of the composite particles and the silicon-based particles. Due to their different chemical composition, the difference in brightness allows for an easy distinction between both types of particles.
3. At least 1000 discrete cross-sections of silicon-based particles, not overlapping with another cross-section of a silicon-based particle, are selected from one or several of the acquired SEM image(s), using a suitable image analysis software. These discrete cross-sections of silicon-based particles can be selected from one or more cross-sections of the composite powder comprising the composite particles and the silicon-based particles.
4. The size of the discrete cross-sections of the silicon-based particles are measured using a suitable image analysis software for each of the at least 1000 discrete cross-sections of silicon-based particles.

The d10, d50 and d90 values of the number-based particle size distribution of silicon-based particles, determined using the method described above, are then calculated. These number-based particle size distributions can be readily converted to a weight- or a volume-based particle size distribution via well-known mathematical equations.

Determination of the Volume-Based Particle Size Distribution

The volume-based particle size distribution of the composite particles is determined with a laser diffraction particle size analyzer Malvern Mastersizer 2000. The following measurement conditions are selected: compressed range; active beam length 2.4 mm; measurement range: 300 RF; 0.01 to 900 μm. The sample preparation and measurement are carried out in accordance with the manufacturer's instructions.

Raman Spectroscopy

The Raman spectroscopy analysis of the composite powders is performed with a Renishaw inVia Qontor Raman spectroscope, using a 532 nm laser excitation.

The following steps are performed to treat the acquired spectrum:

1. The background is subtracted by removing the contributions of both the cosmic ray and the baseline.
2. The obtained spectrum is fitted, using appropriate software, with 3 curves: D band, G band and D' band, as presented in FIG. 2. In the case of the presence of graphite particles, a spectrum of pure graphite is firstly acquired and its contribution to the spectrum of the composite powder is subtracted. In the case of the absence of graphite particles, all D, G and D' bands are necessarily contributions from the carbon matrix.
3. Measure the $I_D/I_{D'}$ ratio.

EXPERIMENTAL PREPARATION OF EXAMPLES

Counterexample 1 (CE1), not according to the invention

To produce the powder of Counterexample 1, a silicon-based powder is first obtained by applying a 60 KW radio frequency (RF) inductively coupled plasma (ICP), using argon as plasma gas, to which a micron-sized silicon powder precursor is injected at a rate of circa 200 g/h, resulting in a prevalent (i.e. in the reaction zone) temperature above 2000K. In this first process step, the precursor becomes totally vaporized. In a second process step, an argon flow of 20 $Nm^3/h$ is used as quench gas immediately downstream of the reaction zone in order to lower the temperature of the gas below 1600K, causing a nucleation into metallic submicron silicon powder. Finally, a passivation step is performed at a temperature of 100° C. during 5 minutes by adding 100 l/h of a $N_2/O_2$ mixture containing 1 mole % oxygen.

The specific surface area (BET) of the obtained silicon powder is measured to be 82 $m^2/g$. The oxygen content of the obtained silicon powder is measured to be 7.9 wt %. The number-based particle size distribution of the silicon powder is determined to be: d10=52 nm, d50=111 nm and d90=171 nm.

Then, a dry blend is made of 100 g of the obtained silicon powder and 840 g of polyvinyl chloride (PVC) having a melting point of 160° C. The blend is heated to a temperature of 190° C., under a flow of nitrogen and, after a waiting period of 60 minutes, mixed for 30 minutes under high shear by means of a Cowles dissolver-type mixer operating at 1000 rpm.

The mixture of the silicon powder in PVC thus obtained is cooled to room temperature and, once solidified, pulverized and sieved on a 400-mesh sieve, to produce an intermediate powder 1.

20 g of the obtained intermediate powder 1 are then put in a quartz crucible in a tube furnace, heated up at a heating rate of 3° C./min to 900° C., kept at that temperature for two hours and then cooled. All this is performed under argon atmosphere. In the obtained product, the silicon-based particles are dispersed and embedded in a matrix of soft carbon, resulting from the thermal decomposition of the PVC.

The fired product is finally ball-milled with alumina balls for 1 hour at 300 rpm and sieved over a 325-mesh sieve, to obtain the powder of Counterexample 1.

The key synthesis parameters are summarized in Table 1.

The total Si content in this powder is measured to be 39.3 wt % by XRF, having an experimental error of +/−0.3 wt %. This corresponds to a calculated value based on a weight loss of the PVC upon heating of circa 84 wt % and an insignificant weight loss upon heating of the other components. The calculated ratio of carbon content resulting from the carbonization of the PVC, forming the matrix material, over the silicon content in the powder is around 1.46. The oxygen content of this powder is measured to be 3.4 wt %. The specific surface area (BET) of the obtained powder is measured to be 3.3 $m^2/g$.

The volume-based particle size distribution of the composite particles obtained has a D10 equal to 5.4 μm, a D50 equal to 15.8 μm and a D90 equal to 24.6 μm.

The powder of Counterexample 1 is then analyzed by Raman spectroscopy, following the procedure previously described. A ratio of the intensity of the D peak, positioned at 1344 $cm^{-1}$, over the ratio of the D' peak, positioned at 1610 $cm^{-1}$, of 0.54 is obtained. This value is reported in Table 2.

Example 1 (E1), According to the Invention

The composite powder of Example 1 (E1) is produced using the same method as for the production of the composite powder of Counterexample 1 (CE1), except that the intermediate powder 1 is heated up to 1000° C. instead of 900° C.

The total Si content in this composite powder is measured to be 39.3 wt % by XRF. The oxygen content of this powder is measured to be 3.5 wt %. The specific surface area (BET) of the obtained powder is measured to be 3.2 $m^2/g$.

The volume-based particle size distribution of the composite particles obtained has a D10 equal to 5.2 μm, a D50 equal to 16.1 μm and a D90 equal to 25.2 μm.

Figure 2:
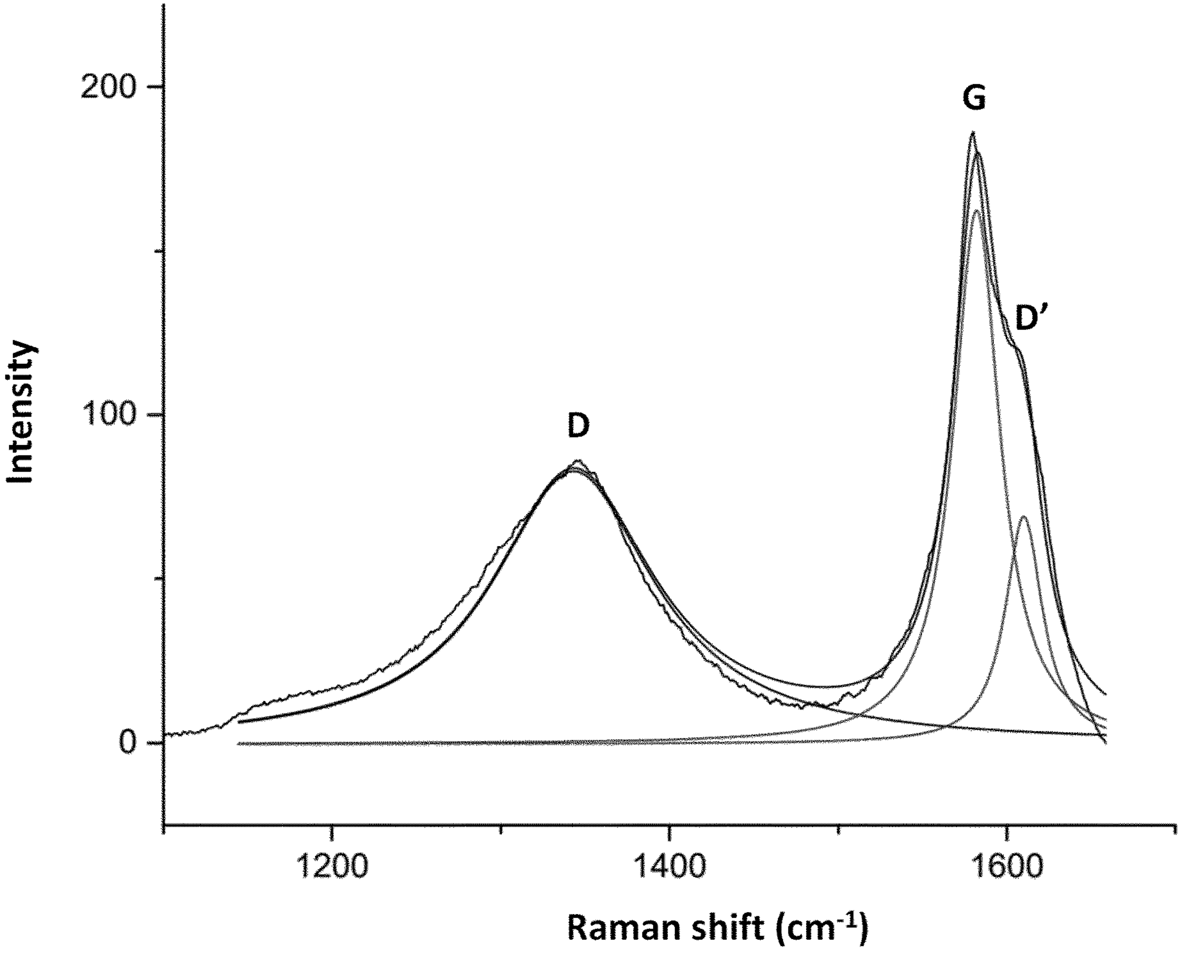
FIG. 2: Raman spectrum of composite powder E1 with peak fitting

The Raman spectrum obtained for composite powder E1 is given in FIG. 2. A ratio of the intensity of the D peak, positioned at 1344 $cm^{-1}$, over the ratio of the D' peak, positioned at 1610 $cm^{-1}$, of 1.23 is obtained.

Counterexample 2 (CE2), not According to the Invention

To produce the composite powder of Counterexample 2 (CE2), the same silicon powder as in Counterexample 1 (CE1) is used. A dry blend is made of 100 g of the silicon powder and 750 g of polyvinyl chloride (PVC) having a melting point of 210° C. The blend is heated to a temperature of 240° C., under a flow of nitrogen and, after a waiting period of 60 minutes, mixed for 30 minutes under high shear by means of a Cowles dissolver-type mixer operating at 1000 rpm.

The mixture of the silicon powder in PVC thus obtained is cooled to room temperature and, once solidified, pulverized and sieved on a 400-mesh sieve, to produce an intermediate powder 2.

20 g of the obtained intermediate powder 2 are then put in a quartz crucible in a tube furnace, heated up at a heating rate of 3° C./min to 900° C., kept at that temperature for two hours and then cooled. All this is performed under argon atmosphere. In the obtained product, the silicon-based particles are dispersed and embedded in a matrix of soft carbon, resulting from the thermal decomposition of the PVC.

The fired product is finally ball-milled with alumina balls for 1 hour at 300 rpm and sieved over a 325-mesh sieve, to obtain the powder of Counterexample 2.

The total Si content in this powder is measured to be 39.2 wt %. This corresponds to a calculated value based on a weight loss of the PVC upon heating of circa 82 wt % and an insignificant weight loss upon heating of the other components. The calculated ratio of carbon content resulting from the carbonization of the PVC over the silicon content in the powder is around 1.47. The oxygen content of this powder is measured to be 3.4 wt %. The specific surface area (BET) of the obtained powder is measured to be 3.4 $m^2/g$.

The volume-based particle size distribution of the composite particles obtained has a D10 equal to 5.6 μm, a D50 equal to 16.4 μm and a D90 equal to 25.6 μm.

Example 2 (E2), According to the Invention

The composite powder of Example 2 (E2) is produced using the same method as for the production of the composite powder of Counterexample 2 (CE2), except that the intermediate powder 2 is heated up to 1000° C. instead of 900° C.

The total Si content in this composite powder is measured to be 39.2 wt % by XRF. The oxygen content of this powder is measured to be 3.6 wt %. The specific surface area (BET) of the obtained powder is measured to be 3.5 $m^2/g$.

The volume-based particle size distribution of the composite particles obtained has a D10 equal to 4.9 μm, a D50 equal to 15.6 μm and a D90 equal to 23.8 μm.

Example 3 (E3), According to the Invention

To produce the composite powder of Example 3 (E3) the same procedure as for the composite powder of Example 2 (E2) is used, except that 20 g of the intermediate powder 2 are mixed with 26 g of graphite. The resulting mixture is put in a quartz crucible in a tube furnace, heated up at a heating rate of 3° C./min to 1000° C., kept at that temperature for two hours and then cooled. All this is performed under argon atmosphere. In the obtained product, the silicon-based particles are dispersed and embedded in a matrix of soft carbon, resulting from the thermal decomposition of the PVC. The graphite particles are not embedded in the matrix of soft carbon.

The fired product is finally ball-milled with alumina balls for 1 hour at 300 rpm and sieved over a 325-mesh sieve, to obtain the powder of Example 3.

The ratio of carbon content resulting from the carbonization of the PVC over the silicon content in the composite powder E3 is around 1.47.

The total Si content in this composite powder is measured to be 17.0 wt % by XRF.

The oxygen content of this powder is measured to be 1.5 wt %. The specific surface area (BET) of the obtained powder is measured to be 3.3 $m^2/g$.

The volume-based particle size distribution of the composite particles obtained has a D10 equal to 5.2 μm, a D50 equal to 15.7 μm and a D90 equal to 24.4 μm.

Counterexample 3 (CE3), not According to the Invention

To produce the composite powder of Counterexample 3 (CE3), the same silicon powder as in Counterexample 1 (CE1) is used. A wet blend is made of 100 g of the silicon powder and 180 g of a phenolic resin precursor (mixture of phenol+formaldehyde) having a cross-linking temperature of 100° C. and mixed for 30 minutes under high shear by means of a Cowles dissolver-type mixer operating at 1000 rpm under a flow of nitrogen. The wet blend is heated to a temperature of 200° C. for 30 minutes, still under a flow of nitrogen, completing the polymerization reaction.

The mixture of the silicon powder in the phenolic resin thus obtained is cooled to room temperature, pulverized and sieved on a 400-mesh sieve, to produce an intermediate powder 3.

20 g of the obtained intermediate powder 3 are then put in a quartz crucible in a tube furnace, heated up at a heating rate of 3° C./min to 1000° C., kept at that temperature for two hours and then cooled. All this is performed under argon atmosphere. Contrarily to the previously obtained composite powders, in the composite powder of Counterexample 3, the silicon-based particles are dispersed and embedded in a matrix of hard carbon, resulting from the thermal decomposition of the phenolic resin.

The fired product is finally ball-milled with alumina balls for 1 hour at 300 rpm and sieved over a 325-mesh sieve, to obtain the powder of Counterexample 1.

The total Si content in this powder is measured to be 39.2 wt % by XRF. This corresponds to a calculated value based on a weight loss of the phenolic resin upon heating of circa 25 wt % and an insignificant weight loss upon heating of the other components. The calculated ratio of carbon content resulting from the carbonization of the phenolic resin over the silicon content in the powder is around 1.47. The oxygen content of this powder is measured to be 3.4 wt %. The specific surface area (BET) of the obtained powder is measured to be 4.2 $m^2/g$.

The volume-based particle size distribution of the composite particles obtained has a D10 equal to 6.2 μm, a D50 equal to 17.2 μm and a D90 equal to 26.3 μm.

TABLE 1

Summary of the synthesis parameters of the composite powders E1-E3 and CE1-CE3

| Example # | Composition Si/C matrix/ O/graphite | C precursor melting point (° C.) | Heat treatment temperature (° C.) | Ratio C matrix/ Si |
|---|---|---|---|---|
| CE1 | 39.3/57.3/3.4/0 | 160 | 900 | 1.46 |
| E1 | 39.3/57.2/3.5/0 | 160 | 1000 | 1.46 |
| CE2 | 39.2/57.4/3.4/0 | 210 | 900 | 1.47 |
| E2 | 39.2/57.2/3.6/0 | 210 | 1000 | 1.46 |
| E3 | 17.0/25.0/1.5/56.5 | 210 | 1000 | 1.47 |
| CE3 | 39.2/57.4/3.4/0 | / | 1000 | 1.47 |

Electrochemical Evaluation of the Composite Powders

The produced composite powders are tested in coin-cells according to the procedure specified above. Only the composite powder E3, which comprises graphite is already at the target capacity of 800 mAh/g #20 mAh/g, the others being at specific capacities around 1380 mAh/g. Therefore, the composite powders E1, E2, CE1, CE2 and CE3 are mixed with graphite during the electrode preparation, to achieve a capacity of the mixture "composite powder+graphite" of around 800 mAh/g. The results obtained for the average coulombic efficiency between cycle 5 and cycle 50 are given in Table 2.

Comparing the results of the composite powders from E1 to E3-according to the—with the composite powders from CE1 to CE3, it can be seen that the best results are obtained for the cells containing the composite powders having a ratio $I_D/I_D'$ comprised between 0.9 and 4.0, in particular between 1.0 and 3.0 and even more in particular between 1.0 and 2.6, for the possible reasons that have been previously given.

TABLE 2

Performance of coin-cells containing composite powders E1-E3 and CE1-CE3

| Example # | Ratio $I_D/I_{D'}$ | Average coulombic efficiency cycles 5-50 (%) |
|---|---|---|
| CE1 | 0.54 | 99.36 |
| E1 | 1.23 | 99.58 |
| CE2 | 0.72 | 99.41 |
| E2 | 2.51 | 99.69 |
| E3 | 2.52 | 99.72 |
| CE3 | 5.04 | 99.45 |

The invention claimed is:

1. A composite powder for use in a negative electrode of a battery comprising composite particles, said composite particles comprising a carbon matrix material and silicon-based particles embedded in said carbon matrix material, said composite powder having a Raman spectrum, wherein a D band and a D' band, both corresponding to the carbon matrix material contribution, have their respective maximum intensity Ip between 1330 $cm^{-1}$ and 1360 $cm^{-1}$ and $I_D'$ between 1600 $cm^{-1}$ and 1620 $cm^{-1}$, wherein the ratio $I_D/I_D'$ is at least equal to 0.9 and at most equal to 3.8.

2. The composite powder according to claim 1, wherein the $I_D/I_D'$ ratio is at least equal to 1.0 and at most equal to 3.0.

3. The composite powder according to claim 1, wherein the $I_D/I_D'$ ratio is at least equal to 1.0 and at most equal to 2.6.

4. The composite powder according to claim 1, wherein the carbon matrix material is soft carbon.

5. The composite powder according to claim 1, wherein the composite powder has a silicon content S expressed in weight percent (wt %), wherein 10 wt %≤S≤60 wt %.

6. The composite powder according to claim 1, wherein the composite powder has a carbon content C expressed in weight percent (wt %), wherein 30 wt %≤C≤90 wt %.

7. The composite powder according to claim 1, wherein the composite powder has a silicon content S and an oxygen content N, both expressed in weight percent (wt %), wherein N≤0.20 S.

8. The composite powder according to claim 1, wherein the silicon-based particles are characterized by a number-based size distribution having a d50, the d50 being larger than or equal to 20 nm and smaller than or equal to 150 nm.

9. The composite powder according to claim 1, wherein the silicon-based particles are covered, for at least 50% of their surface, with the carbon matrix material.

10. The composite powder according to claim 1, wherein a silicon content in the silicon-based particles is at least equal to 80 wt %.

11. The composite powder according to claim 1, wherein the composite powder also comprises graphite and/or graphene particles, such that less than 10% of the surface of the graphite and/or graphene particles is covered with the carbon matrix material.

12. The composite powder according to claim 1, wherein the composite powder has a BET surface area which is at most 10 $m^2/g$.

13. The composite powder according to claim 1, wherein the composite particles have a volume-based particle size distribution having a D10, a D50 and a D90, with 1 μm≤D10≤10 μm, 5 μm≤D50≤25 μm and 10 μm≤D90≤40 μm.

14. A negative electrode comprising a composite powder according to claim 1.

15. A battery comprising a negative electrode according to claim 14.

16. The composite powder according to claim 1, wherein the ratio $I_D/I_D'$ is at least equal to 0.9 and at most equal to 3.6.

17. The composite powder according to claim 1, wherein the ratio $I_D/I_D'$ is at least equal to 0.9 and at most equal to 3.4.

* * * * *